United States Patent
Weeber et al.

(10) Patent No.: US 7,168,520 B2
(45) Date of Patent: Jan. 30, 2007

(54) POWER-ASSISTED STEERING SYSTEM OF AN AUTOMOBILE

(75) Inventors: Kai Weeber, Weissach (DE); Rainer Muenz, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/239,043

(22) PCT Filed: Mar. 10, 2001

(86) PCT No.: PCT/DE01/00922

§ 371 (c)(1),
(2), (4) Date: Feb. 10, 2003

(87) PCT Pub. No.: WO01/70555

PCT Pub. Date: Sep. 27, 2001

(65) Prior Publication Data

US 2003/0150665 A1    Aug. 14, 2003

(30) Foreign Application Priority Data

Mar. 20, 2000   (DE) ................................ 100 13 711

(51) Int. Cl.
*B62D 5/04* (2006.01)

(52) U.S. Cl. ...................... 180/443; 180/421; 180/422; 180/444; 180/446; 701/41; 701/42

(58) Field of Classification Search ................ 180/421, 180/422, 446, 443; 701/41, 42
See application file for complete search history.

(56) References Cited

U.S. PATENT DOCUMENTS

| | | | | |
|---|---|---|---|---|
| 3,580,352 A | * | 5/1971 | Hestad et al. ................ | 180/402 |
| 4,730,687 A | * | 3/1988 | Chikuma et al. ............ | 180/422 |
| 4,951,199 A | * | 8/1990 | Whitehead ................... | 701/41 |
| 4,956,590 A | * | 9/1990 | Phillips ........................ | 318/432 |
| 5,205,371 A | | 4/1993 | Karnopp | |
| 5,267,625 A | | 12/1993 | Shmizu | |
| 5,682,745 A | * | 11/1997 | Phillips ........................ | 60/431 |
| 5,853,064 A | * | 12/1998 | Hackl et al. ................. | 180/422 |
| 5,887,675 A | * | 3/1999 | Hackl et al. ................. | 180/422 |
| 5,893,429 A | * | 4/1999 | Hackl et al. ................. | 180/443 |

(Continued)

FOREIGN PATENT DOCUMENTS

DE       40 31 316 A1     4/1992

(Continued)

*Primary Examiner*—Lesley D. Morris
*Assistant Examiner*—Marlon Arce-Diaz
(74) *Attorney, Agent, or Firm*—Baker & Daniels LLP

(57) ABSTRACT

A servo-assisted steering system for a motor vehicle, in which the steering system includes a steering wheel for presetting a desired steering angle for the wheels of the motor vehicle, a driving-dynamics means for superimposing a correction angle on the steering angle, the correction angle being determined with a view toward increasing the driving stability and/or the driving comfort of the motor vehicle, and a servo drive. To keep the efficiency of the driving-dynamics means nearly constant over the entire road-speed range of the vehicle, the servo drive is implemented as a variable torque assistance system, the degree of torque assistance being dependent on the road speed of the vehicle and on at least one variable of the driving-dynamics means that characterizes the correction angle.

9 Claims, 2 Drawing Sheets

U.S. PATENT DOCUMENTS

| | | | | |
|---|---|---|---|---|
| 6,152,254 A * | 11/2000 | Phillips | | 180/422 |
| 6,186,267 B1 * | 2/2001 | Hackl et al. | | 180/444 |
| 6,219,604 B1 * | 4/2001 | Dilger et al. | | 180/446 |
| 6,446,749 B2 * | 9/2002 | Hackl et al. | | 180/446 |

FOREIGN PATENT DOCUMENTS

| | | |
|---|---|---|
| DE | 42 36 771 A1 | 5/1993 |
| DE | 100 44 206 A1 | 5/2001 |
| JP | 11-078945 | 3/1999 |

\* cited by examiner

Key to figure;
$a_{soll} = a_{nominal}$
$a_{ist} = a_{actual}$

POWER-ASSISTED STEERING SYSTEM OF AN AUTOMOBILE

BACKGROUND OF THE INVENTION

The present invention concerns a servo-assisted steering system for a motor vehicle, said steering system comprising a steering wheel for presetting a desired steering angle for the wheels of the vehicle, driving-dynamics means for superimposing a correction angle on the steering angle, said correction angle being determined with a view toward increasing the driving stability and/or driving comfort of the motor vehicle, and a servo drive. The invention further concerns a servo drive of a servo-assisted steering system for a motor vehicle, implemented as variable torque assistance and comprising a converter that can be acted upon by a converter flow and that serves as a control device for the steering angle of the wheels of the motor vehicle, and means for determining the converter flow as a function at least of the road speed of the motor vehicle. Finally, the invention concerns a method for determining the converter flow of a servo drive implemented as variable torque assistance and forming part of a servo-assisted steering system of a motor vehicle, said servo drive comprising a converter that can be acted upon by the converter flow and that serves as a control device for the steering angle of the wheels of the motor vehicle, and the converter flow being determined as a function at least of the road speed of the motor vehicle.

In the steering systems known from the prior art, it is known to provide a servo drive for torque assistance (servo steering). The known servo drives are divided into hydraulic, electrohydraulic and electrical systems. In the case of hydraulic systems, a distinction is drawn between systems with permanently preset torque assistance (normal servo steering) and variable torque assistance, in which the degree of torque assistance is controlled as a function of the road speed of the vehicle. At low speeds, for example during parking, the amount of energy expended by a driver in operating the steering wheel is slight. With increasing road speed, a greater amount of energy is expended by the driver. Variable torque assistance gives the steering system especially easy action at low road speeds without causing it to become "soft" at higher speeds. A description of the design and operation of a servo steering system can be found in the paper "Servo drives for front- and rear-wheel steering systems in passenger vehicles," H. Bischof, G. Dräger, W. Schleuter, a contribution to the All-Wheel Drive Conference, Haus der Technik, Essen, Nov. 28–29, 1989, pp. 1 to 16, which is incorporated herein by reference.

It is further known from the prior art to provide driving-dynamics means in steering systems in order to superimpose a correction angle on the steering angle of the wheels which is preset by the steering wheel. Driving-dynamics means are also known as driving-dynamics steering systems (DDSS). A "superimposing box" is used to superimpose the angles. The design and manner of operation of a driving-dynamics steering system is described in detail in U.S. Pat. No. 5,205,371, the disclosure of which is incorporated herein by reference. A driving-dynamics steering system improves driving dynamics, vehicle safety, and vehicle comfort. However, a power-assist function (servo steering) cannot be obtained with such a system. The correction angle that is to be added to the preset steering angle changes the actual steering angle of the wheels. The turning angle of the steering wheel preset by the driver is not altered, and remains in its preset position.

In the case of servo-assisted steering systems comprising both a servo drive for torque assistance and driving-dynamics means, the driving-dynamics means are usually arranged between the steering wheel and the servo drive. With variable torque assistance, however, this has the result that the servo drive affects the dynamics of the driving-dynamics means, especially the dynamics of an electric motor as shown in U.S. Pat. No. 5,205,371 of the driving dynamics means. The efficiency of the driving-dynamics means is not the same over the vehicle's entire range of road speeds. At higher vehicle speeds, the torque assistance is so slight that the electric motor of the driving-dynamics means has to work against very high countertorque. As a result, the electric motor cannot be accelerated as quickly and the steering interventions of the vehicle's driving-dynamics means are unable to stabilize quickly and reliably enough to increase the driving comfort of the vehicle.

It is therefore the object of the present invention, in servo-assisted steering systems comprising both driving-dynamics means and variable torque assistance, to achieve efficiency for the driving-dynamics means over the entire road-speed range of the motor vehicle.

SUMMARY OF THE INVENTION

To accomplish the above object, proceeding from the servo-assisted steering system of the type described hereinabove, the present invention implements the servo drive as a variable torque assistance system, the degree of torque assistance being dependent on the vehicle's road speed and on at least one variable of the driving-dynamics means that characterizes the correction angle.

In the steering system of the present invention, the vehicle's road speed is not the only input variable of the servo drive implemented as a variable torque assistance system. The servo drive has in addition at least one other input variable, by means of which the degree of torque assistance can also be varied according to the steering interventions called for by the driving-dynamics means. These additional input variables make it possible to adjust the degree of torque assistance by means of the servo drive in such a way that the efficiency of the driving-dynamics means is nearly constant over the entire road-speed range of the vehicle. The driving-dynamics means are thus able to improve the driving stability and driving comfort of the vehicle in an especially fast-reacting and reliable manner.

According to an advantageous improvement of the present invention, it is proposed that the driving-dynamics means comprise a motor for eliciting the correction angle, the variables of the driving-dynamics means that characterize the correction angle being implemented as the actual acceleration of the motor and/or the nominal acceleration of the motor. The motor is preferably an electric motor. The actual acceleration is the measured acceleration of the motor of the driving-dynamics means. The nominal acceleration is the motor acceleration calculated by the driving-dynamics means. The correction angle determined by the driving-dynamics means, particularly the duration of the superimposition of the correction angle on the steering angle, is characterized primarily by these two variables.

According to a preferred embodiment of the present invention, it is proposed that the servo drive be implemented as a hydraulic torque assistance system. The servo drive advantageously comprises a converter, which can be acted upon by a converter flow and serves as a control device for the steering angle of the wheels of the motor vehicle, and means for determining the converter flow as a function of the road speed of the motor vehicle, the actual acceleration of the motor and the nominal acceleration of the motor. The converter serves as a control device in the steering box of the steering system and is implemented, for example, as a proportional valve.

According to a preferred embodiment of the present invention, the means for determining the converter flow comprise first means for constructing a first road-speed-dependent converter flow, second means for constructing a second converter flow dependent on the actual acceleration of the motor and the nominal acceleration of the motor, and third means for determining the converter flow from the first converter flow and the second converter flow.

The first means advantageously comprises a lowpass filter for filtering the road-speed values of the vehicle and a characteristic curve from which the relationship between the filtered road-speed values and values for the first converter flow may be obtained. Filtering the road-speed values of the vehicle makes it possible to gradually adjust the degree of torque assistance to the vehicle's true road speed. This improves the subjective impression for the driver, especially during driving maneuvers in which the vehicle's road speed changes abruptly, for example during full brake application. The characteristic curve is usually nonlinear. With the aid of this curve, a filtered road-speed value can be reflected in the corresponding value of the first converter flow.

It is further proposed that the second means comprises a differentiator for constructing a differential acceleration from the difference between the actual acceleration of the motor and the nominal acceleration of the motor, a quantity former for constructing the quantity of the differential acceleration, a multiplier for multiplying the differential acceleration by a presettable factor, and a delay unit for constructing the second converter flow by applying a preset dead time to the quantity of the differential acceleration multiplied by said factor. The dead range prevents any unnecessary fluctuations in torque assistance due to small movements of the motor. By varying the presettable factor, it is possible to vary the amplitude of the second converter flow and thus the influence of the second converter flow on the total converter flow.

The third means advantageously comprises an adder for constructing the converter flow by adding the first converter flow and the second converter flow. The converter flow so determined is applied to the converter, which then effects the appropriate torque assistance.

As a further means of accomplishing the object of the present invention, proceeding from the servo drive of a servo-assisted steering system of the type cited at the beginning hereof, it is proposed that the steering system comprises driving-dynamics means for superimposing a correction angle on the steering angle, said correction angle being determined with a view toward increasing the driving stability and/or the driving comfort of the vehicle, and that the means for determining the converter flow do so as a function of at least one variable of the driving-dynamics means that characterizes the correction angle.

Finally, as a further means of accomplishing the object of the present invention, proceeding from the method for determining the converter flow of a servo drive of the type cited at the beginning hereof, it is proposed that the steering comprise driving-dynamics means for superimposing a correction angle on the steering angle, said correction angle being determined with a view toward increasing the driving stability and/or the driving comfort of the vehicle, and that the converter flow be determined as a function of at least one variable of the driving-dynamics means that characterizes the correction angle.

BRIEF DESCRIPTION OF THE DRAWINGS

A preferred exemplary embodiment of the present invention is described in further detail hereinbelow with reference to the drawings, wherein:

In FIG. 1, the motor-vehicle servo-assisted steering system according to the invention is denoted as a whole by reference numeral 1. The steering system 1 comprises a steering wheel 2 for presetting a desired steering angle for the steerable wheels 3 of the vehicle. Disposed after steering wheel 2 in steering system 1 are driving-dynamics means 4 for superimposing a correction angle on the steering angle. The design and manner of operation of driving-dynamics means 4 is described in detail in U.S. Pat. No. 5,205,371, to which reference is now expressly made. The correction angle is determined with a view toward increasing the driving stability and/or the driving comfort of the vehicle. The driving-dynamics means 4 comprises a motor 5, particularly an electric motor, for eliciting the correction angle.

Figure 1:
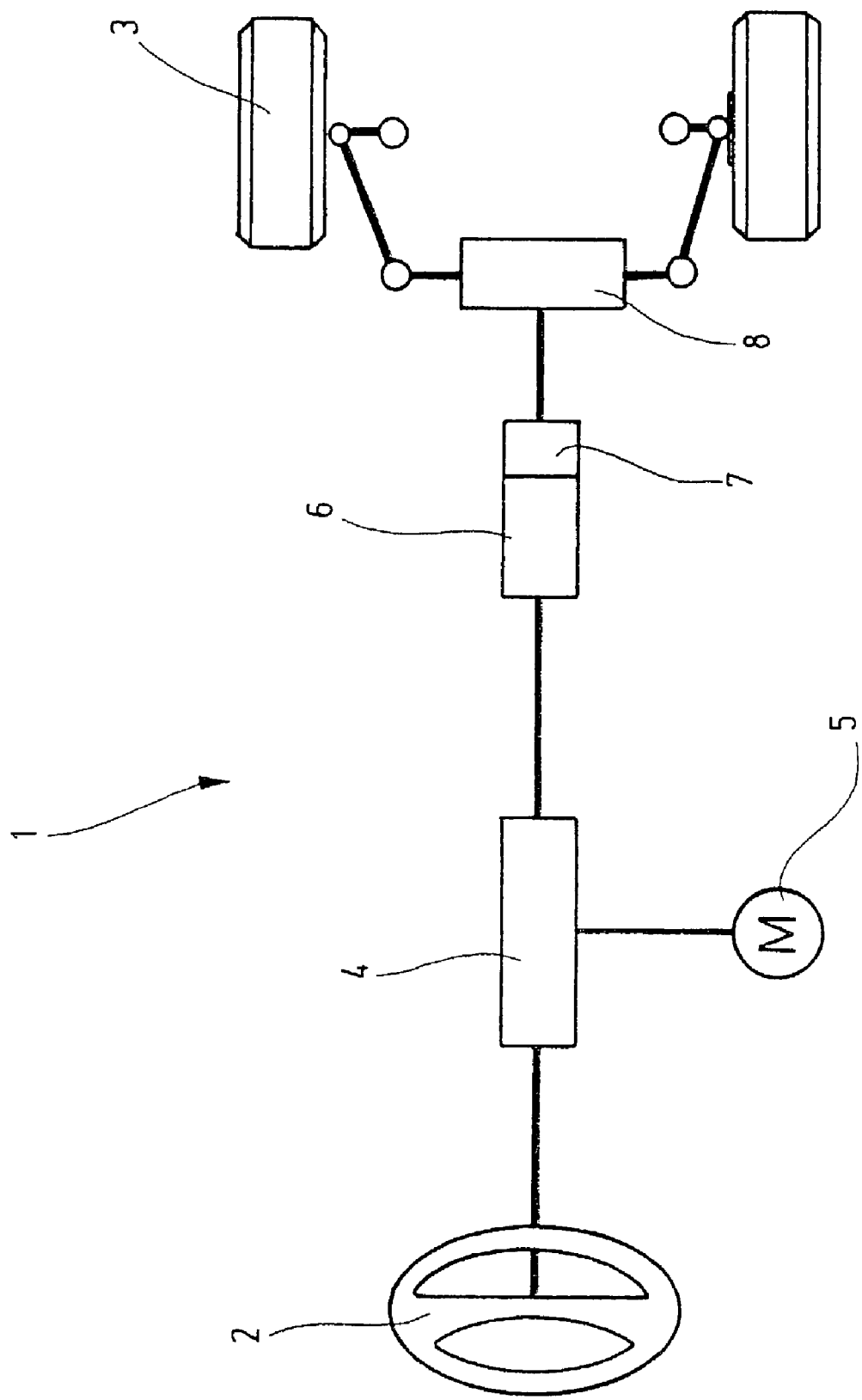
FIG. 1 is a symbolic diagram of a steering system of the invention according to a preferred embodiment.

Disposed after driving-dynamics means 4 in steering system 1 is a servo drive 6 implemented as a variable hydraulic torque assistance system. The servo drive 6 can also, of course, be implemented as an electrohydraulic or electrical torque assistance system. Servo drive 6 includes a control device, realized as a converter 7, for a steering box 8 of steering system 1, by means of which the desired steering angle for the vehicle wheels 3 is set. The converter 7 is implemented, for example, as a proportional valve.

Figure 2:
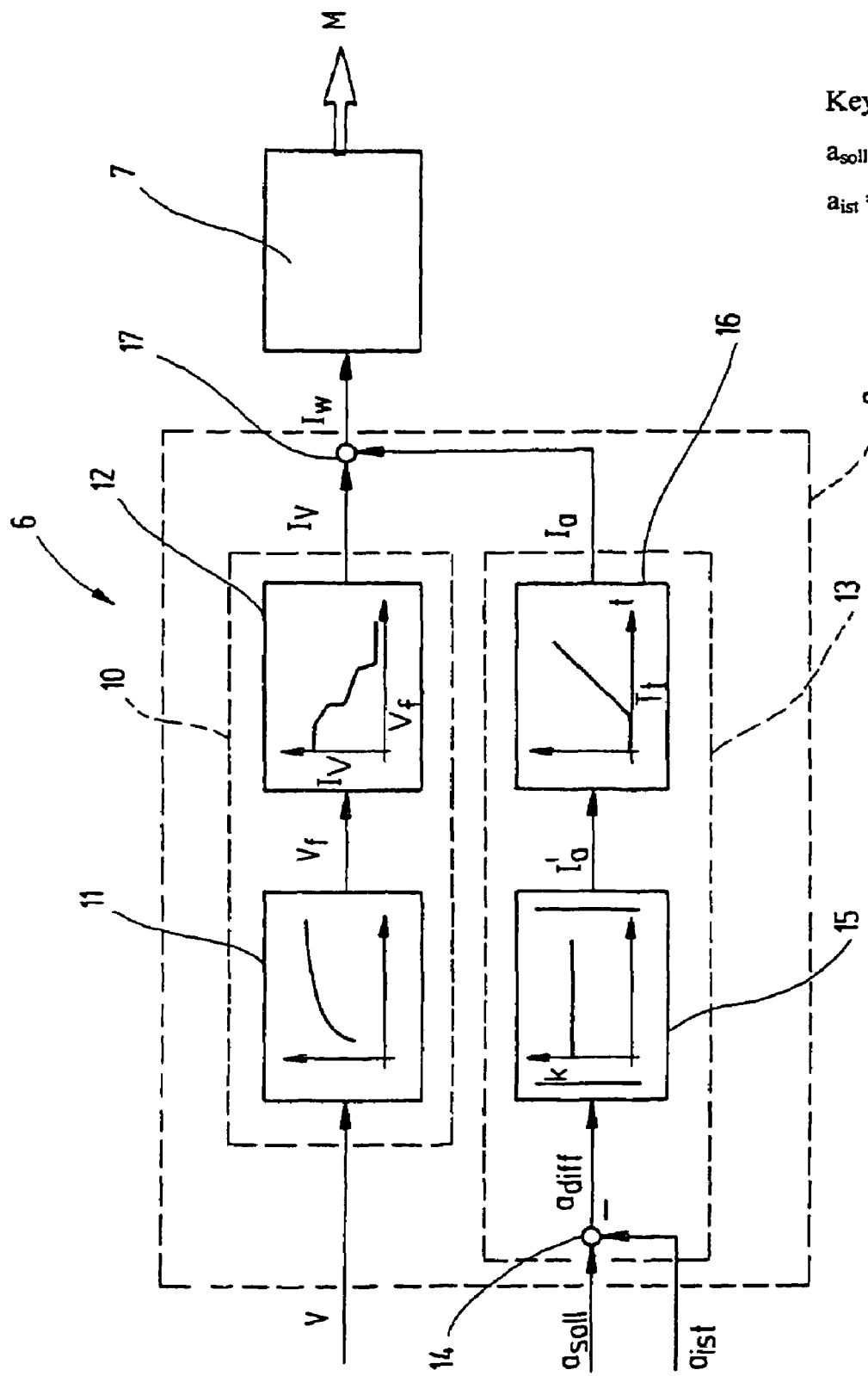
FIG. 2 is a block diagram of a servo drive, according to the invention, for the servo-assisted steering system of FIG. 1, in accordance with a preferred embodiment.

FIG. 2 is a block diagram of the servo drive 6. The degree of torque assistance M furnished by servo drive 6 is controlled as a function of the road speed V of the vehicle. According to the invention, the degree of torque assistance M is also controlled by at least one further variable of driving-dynamics means 4 that characterizes the correction angle. In the exemplary embodiment of FIG. 2, the actual acceleration $a_{actual}$ of motor 5 of driving-dynamics means 4 and the nominal acceleration $a_{nominal}$ of motor 5 are provided as further input variables of servo drive 6. Converter 7 of servo drive 6 can be acted upon by a converter flow $I_w$, which is a measure of the degree of torque assistance M. Servo drive 6 comprises means 9 for determining the converter flow $I_w$ as a function of the road speed V of the vehicle and the actual acceleration $a_{actual}$ and nominal acceleration $a_{nominal}$ of motor 5.

As for a converter flow determiner or means 9 for determining the converter flow $I_w$, these comprise a first converter flow constructor or first means 10 for constructing a first converter flow $I_v$ dependent on road speed. First means 10 include a lowpass filter 11 for filtering the road-speed values V of the motor vehicle and a characteristic curve or graph 12. From characteristic curve 12 can be obtained the relationship between the filtered road-speed values $V_f$ and the corresponding values for the first converter flow $I_v$.

Means 9 for determining the converter flow or converter flow determiner $I_w$ also comprises a second converter flow constructor or second means 13 for constructing a second converter flow $I_a$ dependent on the actual acceleration $a_{actual}$ and the nominal acceleration $a_{nominal}$ of motor 5. Second means 13 include a differentiator 14 for constructing a differential acceleration $a_{diff}$ from the difference between the actual acceleration $a_{actual}$ and the nominal acceleration $a_{nominal}$ of motor 5. Second means 13 further includes a quantity former for constructing the quantity of the differential acceleration $a_{diff}$ and a multiplier for multiplying said differential acceleration $a_{diff}$ by a presettable factor k. By varying factor k, it is possible to vary the amplitude of the second converter flow $I_a$ and thus the influence of the second converter flow $I_a$ on the total converter flow $I_w$. In the exemplary embodiment of FIG. 2, the quantity former and the multiplier are combined in a common functional block 15. Finally, second means 13 comprise a delay unit 16 for constructing the second converter flow $I_a$ by applying a presettable dead time $T_t$ to the quantity $I'_a$ of differential acceleration $a_{diff}$, multiplied by the factor k.

Finally, means 9 for determining the converter flow $I_w$ comprises third means 17 implemented as an adder, which adds first converter flow $I_v$ and second converter flow $I_a$ to construct converter flow $I_w$.

The converter flow $I_w$ of the servo drive 6 according to the invention is determined both as a function of the road speed V of the vehicle and as a function of the operating state of driving-dynamics means 4. The converter flow $I_w$ is delivered to converter 7, which effects the appropriate torque assistance M. The servo drive 6 of the invention makes it possible to keep the efficiency of the driving-dynamics means 4 nearly constant over the entire road-speed range of the vehicle. The makes it possible to increase the driving stability and driving comfort of the vehicle with particular speed and reliability.

The invention claimed is:

1. A servo-assisted steering system for a motor vehicle, said motor vehicle including a plurality of steerable wheels, said steerable wheels having a steering angle, said steering system comprising:
   a steering wheel, said steering wheel presetting a desired steering angle for said steerable wheels;
   a driving-dynamics member, said driving-dynamics device adapted to superimpose a correction angle on said steering angle, said correction angle based on at least one variable which characterizes said correction angle, said correction angle determined to increase the driving stability of said motor vehicle, said driving-dynamics member comprising a motor for generating said correction angle, said correction angle generated from at least one of the actual acceleration of said motor and the nominal acceleration of said motor; and
   a variable torque assistance servo drive for generating torque assistance for the steerable wheels as a function of the road speed of said motor vehicle and said at least one variable.

2. The steering system according to claim 1 wherein said servo drive comprises a hydraulic torque assistance system.

3. The steering system according to claim 1 wherein said servo drive comprises:
   a converter which receives a converter flow as an input, said converter serving to control said steering angle; and
   a converter flow determiner for determining said converter flow as a function of the speed of said motor vehicle, said actual acceleration, and said nominal acceleration.

4. The steering system according to claim 3 wherein said converter flow determiner comprises a first means for generating a first converter flow as a function of vehicle road speed, a second means for generating a second converter flow as a function of said actual acceleration and said nominal acceleration, and a third means for generating said converter flow from said first and second converter flows.

5. The steering system according to claim 4 wherein said first means comprises a lowpass filter for filtering vehicle road speed values, and a graph from which relationship between the filtered vehicle road speed values and the first converter flow may be obtained.

6. The steering system according to claim 4 wherein said second means comprises a differentiator for generating a differential acceleration from the difference between said actual acceleration and said nominal acceleration, a quantity former for generating the quantity of said differential acceleration, a multiplier for multiplying said differential acceleration quantity by means of a predetermined factor, and a delay unit for generating said second converter flow by applying a predetermined dead time to said differential acceleration quantity multiplied by said factor.

7. The steering system according to claim 4 wherein said third means comprises an adder, said adder adding said first and second converter flows to generate said converter flow.

8. The servo-assisted steering system of claim 1 wherein said servo drive and steering system further comprise a converter which has a converter flow as an input and which controls the steering angle of the steerable wheels of the vehicle; and
   a determiner which determines said converter flow as a function of the road speed of the motor vehicle, said steering system including a driving-dynamics means for superimposing a correction angle on said steering angle, said correction angle increasing the driving stability of said motor vehicle, said determiner having as an input at least one variable of said driving-dynamics means which characterizes said correction angle.

9. A method for determining the converter flow of a servo drive or a variable torque servo-assisted steering system of a motor vehicle, said motor vehicle having a steering wheel and steerable wheels, said servo drive including a converter which has a converter flow as an input, said converter acting as a controller for the steering angle of the steerable wheels of said motor vehicle, said servo drive receiving a correction angle input from a driving-dynamics motor, said method comprising:
   determining a desired steering angle with said steering wheel;
   determining a correction angle from two variables comprising the actual acceleration of said driving-dynamics motor and the nominal acceleration of said driving-dynamics motor wherein said correction angle is determined to increase the driving stability of said motor vehicle;
   superimposing said correction angle on said desired steering angle with said driving-dynamics means; and
   determining said converter flow as a function of the road speed of said vehicle and at least one of said variables of said driving-dynamics means which determine said correction angle.

* * * * *